(12) United States Patent
Richards

(10) Patent No.: US 6,408,303 B1
(45) Date of Patent: Jun. 18, 2002

(54) SYSTEM AND METHOD FOR AUTOMATED BUILDING OF A TRADING PARTNER PROFILE

(75) Inventor: Frederick R. Richards, Columbus, OH (US)

(73) Assignee: HealthCare Transaction Processors, Inc., Columbus, OH (US)

( * ) Notice: Subject to any disclaimer, the term of this patent is extended or adjusted under 35 U.S.C. 154(b) by 0 days.

(21) Appl. No.: 09/348,000

(22) Filed: Jul. 6, 1999

(51) Int. Cl.[7] ............................................. G06F 17/30
(52) U.S. Cl. .............................. 707/102; 707/9; 707/1
(58) Field of Search ............................ 707/1, 10, 102, 707/203, 204, 4, 9, 6, 7, 104; 380/25; 709/227

(56) References Cited

U.S. PATENT DOCUMENTS

| | | | |
|---|---|---|---|
| 4,951,196 A | 8/1990 | Jackson | 705/37 |
| 5,367,664 A | 11/1994 | Magill et al. | 714/16 |
| 5,557,780 A | 9/1996 | Edwards et al. | 703/27 |
| 5,644,778 A | 7/1997 | Burks et al. | 705/2 |
| 5,758,126 A | 5/1998 | Daniels et al. | 345/333 |
| 5,761,661 A * | 6/1998 | Coussens et al. | 707/9 |
| 5,794,206 A | 8/1998 | Wilkinson et al. | 705/1 |
| 5,794,234 A * | 8/1998 | Church et al. | 707/4 |
| 5,812,669 A * | 9/1998 | Jenkins et al. | 380/25 |
| 5,890,129 A | 3/1999 | Spurgeon | 705/4 |
| 6,205,482 B1 * | 3/2001 | Navarre et al. | 709/227 |

* cited by examiner

Primary Examiner—Sanjiu Shah
(74) Attorney, Agent, or Firm—Standley & Gilcrest LLP

(57) ABSTRACT

A system and method for building a trading partner profile for use with commercial translator software is disclosed. A list of file types, maps for translating data formats, and instructions for invoking commercial translator software determines what file types a business is willing to accept. Information from this list as well as information from an incoming file is used to create a trading partner profile that the commercial translator software relies on to perform a translation of data from one format (e.g., an EDI standard format) to another format (e.g., a format for a business applications). After determination of the incoming file type, information from the incoming file and the list of file type/map/instructions is extracted to build a trading partner profile that is stored in a trading partner profile database. The commercial translator software uses the trading partner profile to complete the translation of the incoming file to a format for use by business or other applications.

20 Claims, 2 Drawing Sheets

SYSTEM AND METHOD FOR AUTOMATED BUILDING OF A TRADING PARTNER PROFILE

BACKGROUND OF THE INVENTION

1. Field of the Invention

Figure 1:
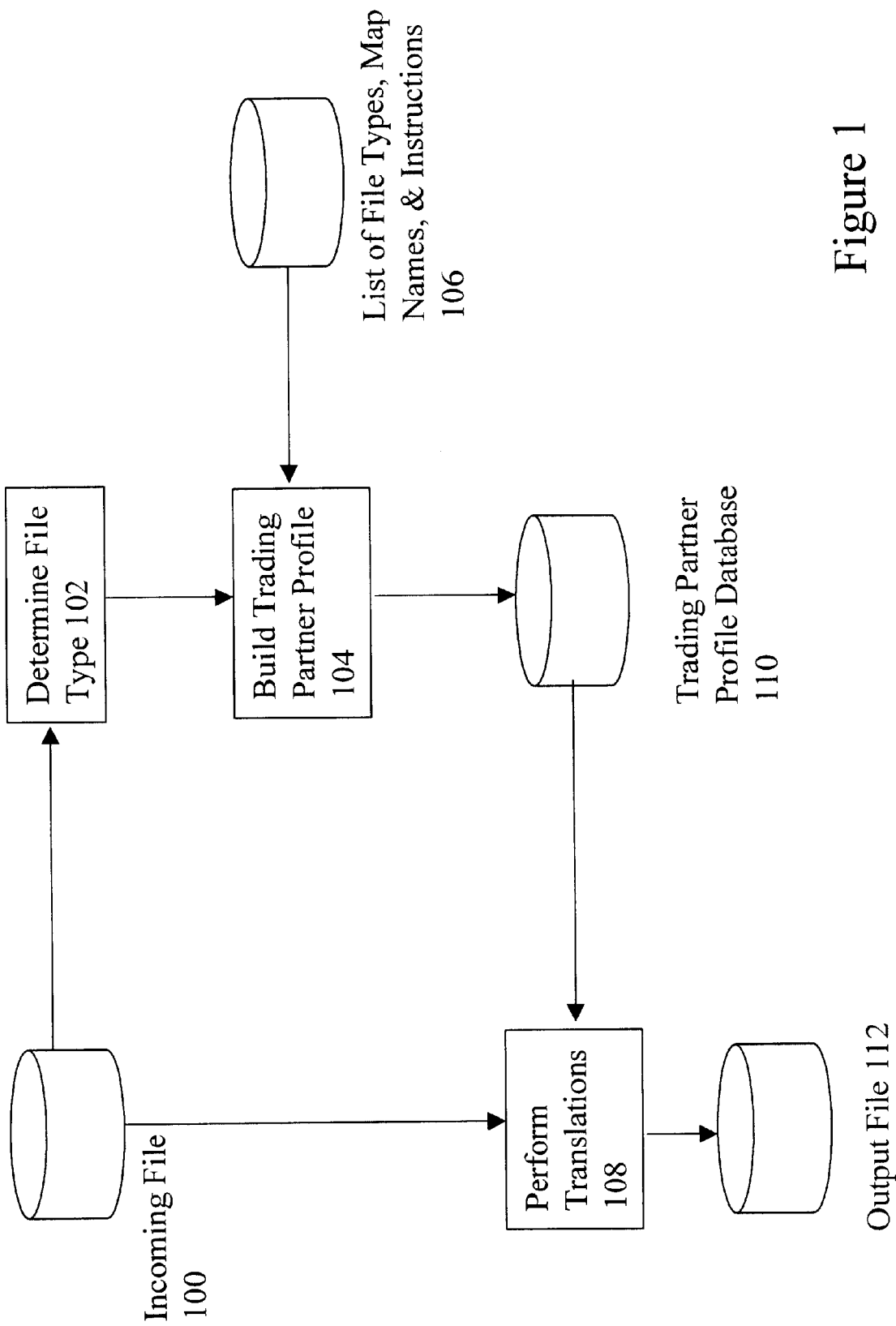

The present invention relates to trading partner profiles that are used in conjunction with commercial translator software. More particularly, the present invention relates to a system and method for examining incoming data in order to build a trading partner profile for use with commercial translator software that supports data conversion from one format to another format based on information contained in a map.

2. Description of Related Art

Electronic Data Interchange (EDI) standards were developed to support computer-to-computer exchange of structured business documents (e.g., invoices, payment orders, price lists, requests for quotes, purchase orders, etc.) between an organization and its vendors, customers, or other trading partners. EDI standards dictate generally the structure and manner in which data is exchanged, but they do not dictate the specific data or file formats nor the communications protocols that the computers must use to exchange data. The standards are not strict so that they may satisfy many user needs. Consequently, there are many combinations of data elements, segments, and transactions that conform to the EDI standards so that a business can select a standard that is appropriate for its data processing environments. Examples of EDI standards include ASC ANSI X12, EDIFACT, TDCC, USC, VICS, EDX, ODETTE, and TRADACOMS. In order to exchange data (even data that does not conform to EDI standards), two businesses (i.e., trading partners) must agree on a format of communication. For example, the trading partners may agree the syntax and structure for data elements (individual data items such as dates, quantities, etc.), segments or records (groupings of elements for the purpose of defining part of a transaction), and transactions (groupings of segments). Regardless of which EDI standards or communication formats organizations support for the exchange of data with the external computer systems of their trading partners, most organizations' internal data processing systems do not use data and file standards that conform to the EDI standards or other standard communication formats. Therefore, if an organization wants to accept or receive for further processing data and/or files that conform to various EDI standards, the incoming data may need to be translated or converted to a data or file format that is compatible with the organization's internal data processing system (i.e., the business applications that process the incoming data or files). Translation or conversion of data may also be required if the organization wants to send data to a trading partner that accepts data only in conformance with a known or pre-defined file format.

To support the exchange of data conforming to EDI standards (or other known or pre-defined data formats), many businesses use a commercially available translator or converter program that translates or converts data from one format to another format. The translator relies on a map that tells it how to change the data from one format to another format. For example, one format may be an incoming ASC ANSI X12 transaction and the other format is an internal processing format that is needed for a particular business application. The map tells the translator how the incoming ASC ANSI X12 transaction should be processed for the business application. For the translator to operate correctly, entries are made in a set of tables to indicate what the incoming transaction is and what map should be used for the translation. The translator then locates the specific map that is required to complete the translation. The map may include information regarding the syntax and structure of the incoming data so that it can be converted to the appropriate output. Although translators are often used for processing of EDI transactions, they may be used for conversion of data that does not necessarily conform to EDI standards as long as the syntax and structure of the incoming data can be defined. The maps that the translator uses may be configured to translate any file of data in one format to another format.

If a business wants to accept or receive transactions from other entities or trading partners, each trading partner that will send data/files must have an entry in a table that provides the information needed by the translator to complete the conversion. An entry in a table for one incoming file of data is called a Trading Partner Profile. The trading partner profile is usually built manually by an individual who reviews the necessary information and creates an entry in a table. The trading partner profile structure is different for each translator so that the individual building the profile must know how to structure the data for the particular translator. The process is time-consuming and prone to errors.

Many businesses have a limited number of entities (usually 300 to 400, but possibly up to 3000) with which they will want to trade (i.e., exchange business documents). Most businesses have ongoing contractual relationship with their trading partners such that each trading partner generates many transactions during the term of the contract. Using manual techniques, it can take 20 to 30 minutes to build the trading partner profile and test an incoming file against the profile to ensure that the profile has been constructed properly. For 300 to 400 or even 3000 trading partners that generate many transactions, use of the manual trading profile building process is very manageable. The transaction costs for handling the transactions in most industries is high enough that the cost of building this information manually can be justified.

In some industries, however, the number of transactions from a trading partner may be very low. For example, in the healthcare industry, one trading partner may send only one transaction to a business such as a payer and not have an ongoing relationship. Handling the transaction on paper costs the receiving entity $0.50 to $1.50. The low paper cost does not justify the expense of building a trading partner profile for the single transaction. More importantly, businesses that typically process single or few transactions with one particular trading partner may have, in fact or potentially, many more trading partners than the 300–400 of the average business. For example, in the healthcare industry, many payers deal with 15,000 to 30,000 trading partners. In these cases, the manual processes of handling the paper transaction and building a trading partner profile are unmanageable and costly. Therefore, there is a need for an efficient and cost-effective method of creating a trading partner profile.

SUMMARY OF THE INVENTION

The present invention automates the process of building a trading partner profile for use with commercial translator software. The present invention is particularly well suited for use by businesses that have many trading partners submitting few transactions. The present invention is cost-effective in any environment that relies on trading partner profiles for processing of EDI-based transactions because the process of building a trading partner profile is fully automated. Information regarding each trading partner for a business is stored in a trading partner profiles database so that a translator in accordance with the trading partner profile may process incoming transactions. Each trading partner profile is comprised of a plurality of fields or parameters that the translator uses in processing files or transactions from a particular trading partner. The present invention therefore automatically determines the values of the fields or parameters that the translator uses for processing. Although the structure of a trading partner profile varies based on the translator used by the business, some basic information is common to virtually all translators.

The present invention is comprised of several software components that operate in accordance with data stored in files, lists, tables, databases, etc. to provide the features and functionality described herein. Although the present invention is described in terms of multiple software components and information stores, it is understood that the features and functionality of the present invention could be provided in accordance with fewer or more components and/or information stores. A Determine File Type component examines an inbound or incoming file to determine its type. A Build Trading Partner Profile component extracts information from the incoming file and a list of file type/map associations to build a trading partner profile that is stored in a trading partner profile database. A Perform Translation component then extracts information from the trading partner profile database to complete the translation of the incoming file to a format for use by business or other applications.

To use the present invention, a business that would like to accept or receive files from various trading partners defines a list of file types that it is willing to accept. The files may be EDI standard or non-EDI files. As long as the business and trading partner have agreed on a file format, any type of file may be processed by the present invention. For each file type that the organization has determined it will accept or receive, the name of a map for the file type and an instruction for calling the translator with the map is further specified in the list. The file type, map name, and instruction information is preferably stored in a table or database. Information in an incoming file drives the process of building the trading partner profile so that it does not have to be created manually. The incoming file is examined to determine its type. After the file type is determined, a trading partner identifier is extracted from the incoming file. The trading partner identifier, preferably, identifies the trading partner profile within the trading partner profile database. If a profile for the trading partner exists, it is used by the translator to complete the translation process. If a profile for the trading partner does not exist, it is built automatically as follows.

First, an entry in the trading partner profile database is created based on the trading partner identifier extracted or selected from the incoming file. Information regarding terminators and separators for the specific commercial translator in use by the business is added to the profile. The terminator and separator information typically is found in the incoming file and is located or selected based on the known or pre-defined structure of the file. Next, a map direction that identifies whether the transaction is inbound or outbound is located or selected and added to the profile. Also stored in the trading partner profile database is a production or test indicator that may be determined from the incoming file. Following completion of the trading partner profile, the translator completes translation of the incoming file based on information contained in the trading partner profile.

BRIEF DESCRIPTION OF THE DRAWING(S)

Figure 2:
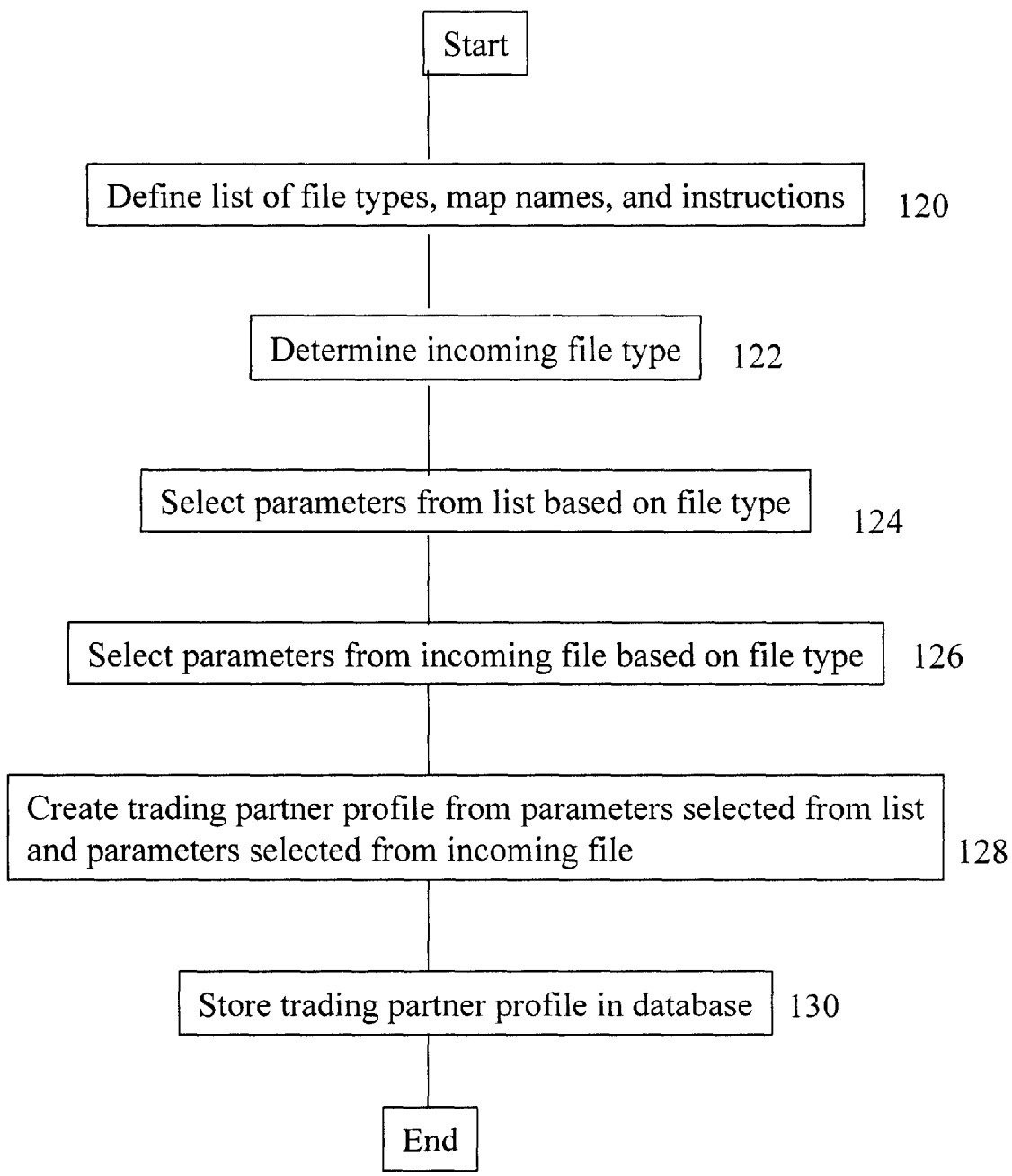

FIG. 1 is a block diagram of the primary components and interconnections of components for a preferred embodiment of the present invention; and FIG. 2 is a flow chart of the primary steps of operation for a preferred embodiment of the present invention.

DETAILED DESCRIPTION OF THE PREFERRED EMBODIMENT(S)

Referring to FIG. 1, a business that would like to accept or receive files from various trading partners defines a list of file types that it is willing to accept. For each file type that the organization has determined it will accept or receive, the name of a map for the file type and an instruction for calling the translator with the map is further specified in the list. The File Type, Map Name, and Instruction information is preferably stored in a table or database (106). The List of File Type, Map Names, and Instructions (106) associations contains the following columns: File Type, Map Name, and an Instruction to call the translator to execute the specific instruction. The file type corresponds to each file type that the business supports. File types may be in accordance with the EDI standards and may include other formats as well. An example of a list of names is provided below. The names may be different based upon the different transactions that the business has decided to support.

A. ANSI 824 Ver 3070
B. ANSI 837 Ver 3040
C. ANSI 837 Ver 3050
D. ANSI 837 Ver 3070
E. ANSI 837 Ver 4010
F. ANSI 997 Acknowledgment
G. NSF UB92 Flat File
H. NSF HCFA Flat File Preferably, name conventions are such that if the transaction is ANSI, then the first 4 characters are "ANSI," followed by the transaction number. The transaction number is followed by "Ver" and then the version issued by ANSI number. The 997 transaction is a response of acknowledgment. This transaction does not need a version number. Flat file formats may have a unique name and are specially coded into the system.

The Map Name that is associated with the file type preferably, is based upon how different translators name the map. For example, "837In," "824Rep," and "277Resp" all identify different maps that may be used in association with a translator.

The Instruction to run call the map is also specific to the individual map. In a preferred embodiment of the present invention, the software components are developed for execution with Windows or DOS based translators. The invention may easily be applied to other platforms by modifying the instruction to operate in accordance with the conventions of the operating system. The specific information in the instruction may be modified based on the needs of the specific translator. Documentation that is provided for the commercial translator software indicates clearly to a developer how an instruction for the translator may be built. In a preferred embodiment of the present invention, the trading partner profile building system and method are developed to operate in accordance with the PaperFee WinMap translator. Examples of other translators that may be used include Sterling Software, St. Paul Software, TSI, and IBM.

To create the file type, map name, and instruction associations for List of File Type, Map Names, and Instructions (106) preferably, the three parameters for each file type are entered into the table through a Windows based screen. The screen has a grid with three columns and many rows. The three pieces of information are then entered in each column for each of the different rows. Once a business decides which file types it will accept or receive, the list or table of associations is easily created. As a business decides to accept new file types, the list or table may be modified to include the new file types. As a result of expanding the list of acceptable files, the business may increase the number of trading partners it has.

The incoming file (100) is received from a trading partner computer system and stored in a directory. The presence of the file (100) triggers the Determine File Type process (102) which, preferably, is an event-driven process. The Determine File Type process (102) opens the file and examines the first three hundred bytes to determine the type of file present. Many different file formats may be support as long as the file format is known or pre-defined. Therefore, the file formats described herein are illustrative only. The Determine File Type process (102) may examine the bytes of the incoming file as follows.

ASC ANSI X12 Transactions

For ASC ANSI X12 transactions, the Determine File Type process (102) examines the ISA segment to determine the version and the ST segment to determine the transaction number. Detail descriptions of the different transactions and the ISA and ST segments may be obtained from DISA, the ASC ANSI X12 Secretary. An example of an ISA Segment is as follows:

ISA*00* *00* *01*312222222 *01*311237647 *990528*0802*U*00304*000000009*0*P*>@

ISA—determines that this is an ANSI transaction and should the set up as an ANSI translation.

312222222—is the identifier that indicates who the sender of the file. This will be the Trading Partner identifier.

311237647—is the identifier that indicates who is the receiver of the file.

00304—determines what version of the transaction is being used. There are differences in the transaction between the different versions. Different maps may be used based upon the version being used.

P—indicates that this is a production file. A "T" may also be placed at this location to indicate that this is a test file.

A ST segment may appear as follows.

ST*837*4001@

837—indicates what ANSI X12 Transaction Number is being sent. There are many different transactions and this number indicates the exact transaction.

NSF Format—320 Byte Record (Medical)

A NSF stands for National Standard Format. The NSF format was developed by the Health Care Finance Administration (HCFA). NSF was originally developed and used only for Medicare and Medicaid claims. Due to the popularity of the format, there were many requests to update the format for use in the commercial businesses of the different carriers performing services form Medicare. The changes where made for commercial insurance business and the format caught on as a very popular format. Due to the popularity of the most carriers accepting electronic claims, will also accept the NSF format. Detail descriptions of the AA0 record and all of the records in the format can be obtained from HCFA's web site.

For NSF format, the Determine File Type process (102) examines the first record type of AA0 to determine if the medical NSF format is being used. An AA0 record appears as follows. AA0ABC TEST SENDER 2777 SOMEWHERE DALLAS Tex.75207M SENDER 2146340403199905251442000 P TEST 0

AA0—indicates that this is in the NSF format.

ABC—is the identifier that indicates who sent the file. This will be the Trading Partner Identifier.

TEST—(Position 254 for 4 characters in the AA0 record) indicates that this is a test file. "PROD" in the same location will indicate that the file is production.

NSF Format—190 Byte Record (Hospital)

An example of the 01 record used in the NSF 190 format is as follows.

01USERID ABC 052198MEDICAL BILLINGS, INC P.O. BOX 210811 DALLAS Tex.753910800 9113334444 000032PROD PASSWOUSERIDT 004

01—This code indicates that this file is in NSF 190 format.

USERID—is the identifier that indicates who the sender of the file. This will be the Trading Partner identifier.

PROD—(Position 143 for 4 bytes) indicates that this is a production file. "TEST" in this position indicate that this is a production file.

Other Formats

In addition to the formats noted above, many other file formats, including non-EDI files, may be supported. Any file format that a business and trading partner have agreed to use may be processed. With information regarding the syntax and structure of the file, the Determine File Type and Build Trading Partner Profile processes may be modified to locate required information from other file formats. There are other formats for the healthcare industry such as HL7 and XML that the industry has started to adopt. As the industry further defines the use of these transactions and begins to expand their use, they may be added to the Determine File Type process to automatically detect the format and build the profiles needed to translate the format.

After the file type has been determined through the Determine File Type process (102), the Build Trading Partner Profile (104) process is called. This process builds the profile as needed for the specific translator being used. Based upon the file type determined by the Determine File Type Process (102,) the Build Trading Partner Profile process (104) examines information from the List of File Types, Map Names, and Instructions (106) as well as the incoming file to obtain the parameters as needed to create the trading partner profile that is stored in the trading partner profile database. The prior descriptions of the various data items indicate how they may be used in a trading partner profile.

Based upon the parameters contained in the list, the trading partner profile database may be updated with the correct information. The trading partner profile is structure is different for each translator but generally has the following structure as the basic information is the same for different translators. Below is the information that is normally contained in each entry in a trading partner profile database as may be established, for example, for an ASC ANSI X12 transaction.

Trading Partner Identifier—The trading partner identifier may be found in a specified location in the incoming transaction. The standard definitions for each file format indicate where in the transaction the trading partner identifier may be found.

Map Name—This information may be found in the List of File Types, Map Names, and Instructions (106) table and is determined in accordance the file type of the incoming file (100).

ANSI X12 Transaction Number—This number is only entered for ANSI transactions. The transaction number comes from the ST segment as described in the section that indicates how the information is extracted or selected from the different transactions.

Map Version—This number comes from the ISA segment as described in the section that indicates how the information is extracted or selected from the different transactions.

Segment Terminator—The ANSI X12 transaction structure is a delimited file format. The segment terminator indicates the end of each of the different record types. More on this structure can be found by obtaining the "ASC ANSI X12 Architecture" document from DISA. The program automatically sets this value to the tilde, which is the industry standard.

Data Element Separator—The ANSI X12 transaction structure is a delimited file format. The data element separator tells the difference between each of the elements in a segment. More on this structure can be found by obtaining the "ASC ANSI X12 Architecture" document from DISA. The Build Trading Partner Profile process, preferably, automatically sets this value to the asterisk, which is the industry standard.

Composite Separator—The ANSI X12 transaction structure is a delimited file format. The composite separator indicates how data is separated within a data element. More on this structure can be found by obtaining the "ASC ANSI X12 Architecture" document from DISA. The Build Trading Partner Profile process, preferably, automatically sets this value to the greater than sign, which is the industry standard.

Map Direction—When a file is received and is to be translated to a format other than what was received, the map direction is considered inbound. Preferably, all maps are set to be handled as inbound, except for the 997 which is set to be outbound, because it is a response to the file being sent.

Production/Test Indication—The production or test indicator is set based upon the data in the file. The location of the field can be found in the documentation on each of the file types. If there is no indicate as to test or production on the incoming file, then the default is production.

The various parameters for the trading partner profile are located or selected from the incoming file and list of file types, map names, and instructions. Upon completion of the entry in the trading partner profile database, the Build Trading Partner Profile process (104) develops the final instruction into the translator and calls the Perform Translation process (108) using the new profile or an existing profile if a profile has been developed previously.

The Perform Translation process (108) then executes using the map instruction that was entered into the system. The Perform Translation process (108) uses the incoming file (100) and the trading partner profile (110) to produce the output file (112). The translation process is then complete and the output file (112) may be used by another business application.

Referring to FIG. 2, a flowchart for the primary steps of the present invention is shown. In the first step 120, a business that wants to use the present invention defines a list of file types and associated map names and instructions for the files it is willing to accept. In the next step 122, when the business's computer system detects an incoming file, a file type for the incoming as file is determined. The file type determination then indicates how information or parameters for the trading partner profile will be located. In the next step 124, parameters are selected from the list based on the file type for the incoming file. For example, the map name that is needed for the trading partner profile may be derived from the list. In the next step 126, parameters are selected lip from the incoming file based on the file type for the incoming file. The file type provides information regarding the syntax and structure of the incoming file so various parameters needed for the trading partner profile may be derived. Next, in step 128, a trading partner profile is created from parameters in the list and parameters in the incoming file. Finally, in step 130, the newly created trading partner profile is stored in a database.

The present invention provides an efficient and cost-effective system and method for building trading partner profiles automatically. The business determines which file types it supports. Trading partner profiles may then be created automatically based on information in the incoming file and the information regarding supported file types. As a result, businesses can maximize the number of trading partners they have and thereby increase the number of transactions they can process. The ability to process more transactions through the business' computer system rather than manually results in greater cost-savings and a better use of resources.

What is claimed is:

1. A system for automated building of a trading partner profile comprising:
   a list comprising file types and associated map names and instructions;
   a plurality of files comprising data in one of a plurality of formats, each of said formats in accordance with one of said file types in said list;
   a first software component for determining a type for each of said files;
   a second software component for building a trading partner profile comprising information from an entry in said list for each of said formats and said files; and
   a database for storing said trading partner profiles.

2. The system of claim 1 further comprising a commercial translator for translating said files from a first format to a second format in accordance with parameters from said trading partner profiles and in accordance with instructions from said list, said instructions selected in accordance with said types for said files.

3. The system of claim 1 wherein each of said trading partner profiles comprises an identifier, map name, transaction number, map version, segment terminator, data element separator, composite separator, map direction, and production/test indication.

4. The system of claim 1 wherein said files comprising data in one of a plurality of formats are in conformance with an EDI standard.

5. The system of claim 4 wherein said EDI standard is selected from the group consisting of ASC ANSI X12, EDIFACT, TDCC, USC, VICS, EDX, ODETTE, and TRADACOMS.

6. The system of claim 1 wherein said files comprising data in one of a plurality of formats are in conformance with a non-EDI standard.

7. The system of claim 1 wherein said files comprising data in one of a plurality of formats are selected from the group consisting of ASC ANSI X12, NSF Format—320 Byte Record, and NSF Format—190 Byte transactions.

8. A method for automated building of a trading partner profile, comprising the steps of:
   a) defining a list comprising file types and associated map names and instructions;
   b) determining a file type for each of a plurality of incoming files;
   c) selecting parameters from said list based on said file types for said incoming files;

d) selecting parameters from said incoming files based on said file types for said incoming files;

e) creating a trading partner profile from said parameters from said list and said parameters from said incoming files; and f) storing said trading partner profile in a database.

9. The method of claim 8 further comprising the steps of:

g) translating said incoming files in accordance with information from said trading partner profile; and h) storing said translated files in output files.

10. The method of claim 8 wherein the step of creating a trading partner profile comprises the steps of:

obtaining an identifier, transaction number, map version, segment terminator, data element separator, composite separator, map direction, and production/test indication from said incoming file; and obtaining a map name from said list of file types, maps, and instructions.

11. The method of claim 8 wherein said incoming files are in conformance with an EDI standard.

12. The method of claim 11 wherein said EDI standard is selected from the group consisting of ASC ANSI X12, EDIFACT, TDCC, USC, VICS, EDX, ODETTE, and TRADACOMS.

13. The method of claim 8 wherein said incoming files are in conformance with a non-EDI standard.

14. The method of claim 8 wherein said incoming files are selected from the group consisting of ASC ANSI X12, NSF Format—320 Byte Record, and NSF Format—190 Byte transactions.

15. A system for automated building of a trading partner profile comprising;

a list of file types, map names, and instructions;

a determine file type software process, said process adapted to determine a file type for an incoming file;

a build trading partner profile software process, said process adapted to select parameters for a trading partner profile from said incoming file and an entry in said list identified in accordance with said file type for said incoming file; and a database for storing said parameters selected by said build trading partner profile software process.

16. The system of claim 15 further comprising a perform translation software process for translating said incoming file in accordance with said parameters from said trading partner profile and in accordance with an instruction from said list, said instruction selected in accordance with said file type.

17. The system of claim 15 wherein said perform translation software process is performed by commercial translator software.

18. The system of claim 15 wherein said trading partner profile comprises an identifier transaction number, map version, segment terminator, data element separator, composite separator, map direction, and production/test indication from said incoming file and a map name from said list.

19. The system of claim 15 wherein said incoming file is in conformance with an EDI standard.

20. The system of claim 15 wherein said incoming file is in conformance with a non-EDI standard.

* * * * *